(12) United States Patent
Komata

(10) Patent No.: US 11,733,843 B2
(45) Date of Patent: Aug. 22, 2023

(54) INFORMATION PROCESSING APPARATUS, INFORMATION PROCESSING METHOD, AND STORAGE MEDIUM

(71) Applicant: CANON KABUSHIKI KAISHA, Tokyo (JP)

(72) Inventor: Toshiya Komata, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/354,973

(22) Filed: Jun. 22, 2021

(65) Prior Publication Data
US 2021/0405855 A1 Dec. 30, 2021

(30) Foreign Application Priority Data

Jun. 30, 2020 (JP) .................. 2020-113354

(51) Int. Cl.
*G06F 3/04842* (2022.01)
*G06F 3/04847* (2022.01)
*G06F 3/0482* (2013.01)

(52) U.S. Cl.
CPC ...... *G06F 3/04842* (2013.01); *G06F 3/04847* (2013.01); *G06F 3/0482* (2013.01)

(58) Field of Classification Search
CPC ............. G06F 3/04842; G06F 3/04847; G06F 3/0482; G06T 7/20; G06T 2207/30242
See application file for complete search history.

(56) References Cited

U.S. PATENT DOCUMENTS

| | | | | |
|---|---|---|---|---|
| 10,169,677 B1* | 1/2019 | Ren | ....................... | G06V 10/758 |
| 2007/0136355 A1* | 6/2007 | Haider | ................... | G06Q 10/00 |
| | | | | 707/999.102 |
| 2009/0010490 A1* | 1/2009 | Wang | ....................... | G06T 7/285 |
| | | | | 382/103 |
| 2012/0128212 A1* | 5/2012 | Almbladh | ............... | G06T 7/254 |
| | | | | 382/107 |
| 2016/0307049 A1* | 10/2016 | Hagisu | ................ | G06F 21/6254 |
| 2018/0350042 A1* | 12/2018 | Zhang | ..................... | G06T 11/20 |
| 2020/0097736 A1* | 3/2020 | Matsui | ..................... | H04N 7/18 |

FOREIGN PATENT DOCUMENTS

| JP | 2010181920 A | 8/2010 |
|---|---|---|
| JP | 2017118324 A | 6/2017 |
| JP | 2017182654 A | 10/2017 |
| JP | 2018207175 A | 12/2018 |

* cited by examiner

*Primary Examiner* — Jennifer N Welch
*Assistant Examiner* — Ashley M Fortino
(74) *Attorney, Agent, or Firm* — Canon U.S.A., Inc. IP Division

(57) ABSTRACT

An apparatus includes an acquisition unit that acquires a count result indicating the number of objects included in a predetermined area of an image captured by an imaging unit, a display control unit that displays on a display unit a graph based on acquired count results, the graph including a first element that is based on a plurality of count results from a plurality of images captured by the imaging unit in a first time period, and a selection unit that, in a case where a user operation specifying the first element in the displayed graph is received, selects, based on a number indicated by the first element, an image whose count result corresponds to the number indicated by the first element from the plurality of images captured in the first time period. The display control unit displays on the display unit the image selected by the selection unit.

22 Claims, 8 Drawing Sheets

INFORMATION PROCESSING APPARATUS, INFORMATION PROCESSING METHOD, AND STORAGE MEDIUM

BACKGROUND

Field

The present disclosure relates to an information processing technique.

Description of the Related Art

Conventionally, there is known an image processing technique for detecting objects included in an image and counting the detected objects. There is also known a technique for displaying a graph illustrating statistics of count results of objects included in images.

Japanese Patent Application Laid-Open No. 2018-207175 discusses a method for calculating an average value of a plurality of count results acquired from a plurality of images in each of a plurality of individual time periods and displaying a bar graph indicating the average value of a plurality of count results per time period.

According to Japanese Patent Application Laid-Open No. 2018-207175, when a certain bar is selected in a displayed graph, an image captured at the oldest imaging time among the plurality of images captured at the time period corresponding to the bar is displayed. Thus, depending on which image was captured at the oldest imaging time, there could be a deviation between the count result corresponding to the bar selected in the displayed graph and the number of objects in the image displayed as the image corresponding to the selected bar. This deviation consequently could be confusing to a user.

SUMMARY

Various embodiments of the present disclosure provide, among other things, a user interface (UI) relating to a graph where the graph is based on count results of objects in images. In various embodiments, an information processing apparatus is provided which includes an acquisition unit configured to acquire a count result indicating a number of objects included in a predetermined area of an image captured by an imaging unit, a display control unit configured to display on a display unit a graph based on count results acquired by the acquisition unit, the graph including a first element that is based on a plurality of count results acquired by the acquisition unit from a plurality of images captured by the imaging unit in a first time period, and a selection unit configured to, in a case where a user operation specifying the first element in the graph displayed by the display control unit on the display unit is received, select, based on a number indicated by the first element, an image whose count result corresponds to the number indicated by the first element from the plurality of images captured by the imaging unit in the first time period. The display control unit displays on the display unit the image selected by the selection unit.

Further features of the present disclosure will become apparent from the following description of exemplary embodiments with reference to the attached drawings.

DESCRIPTION OF THE EMBODIMENTS

Hereinafter, various exemplary embodiments of the present disclosure will be described with reference to the accompanying drawings. The configurations described in the following exemplary embodiments are only examples, and the present disclosure is not limited to the illustrated configurations.

Figure 1:
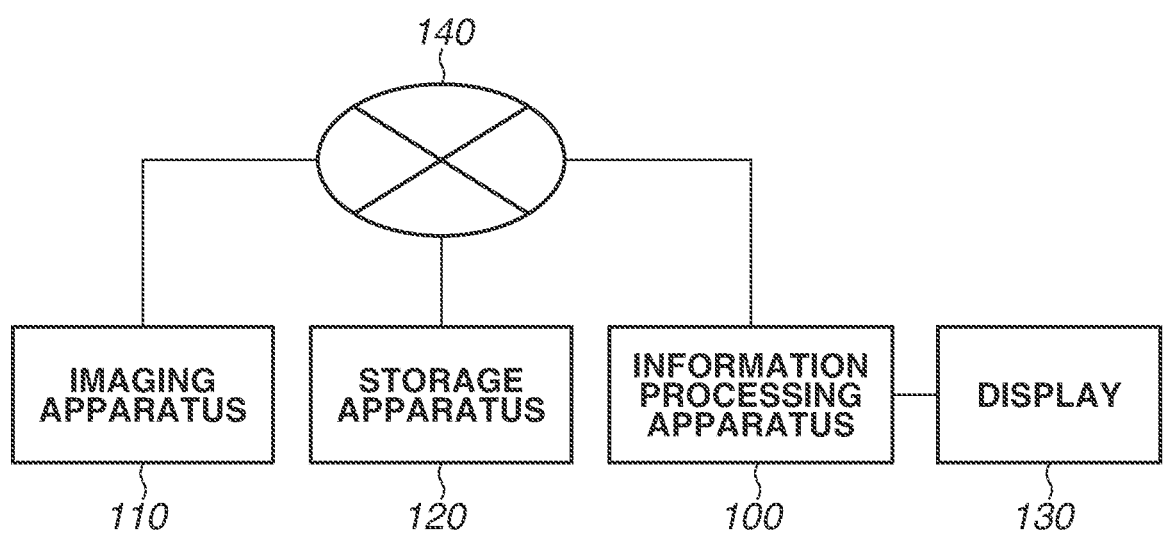
FIG. 1 illustrates an example of a system configuration according to one embodiment.

FIG. 1 illustrates a system configuration according to a first exemplary embodiment. The system according to the first exemplary embodiment includes an information processing apparatus 100, an imaging apparatus 110, a storage apparatus 120, and a display 130.

The information processing apparatus 100, the imaging apparatus 110, and the storage apparatus 120 are connected to each other via a network 140. The network 140 is, for example, realized by a plurality of routers, switches, cables, etc. that comply with communication standards such as ETHERNET®.

The network 140 may be realized by the Internet, a wired local area network (LAN), a wireless LAN, or a wide area network (WAN), for example.

The information processing apparatus 100 is, for example, realized by a personal computer in which a program for realizing the functions of the information processing to be described below is installed.

The imaging apparatus 110 is an apparatus that captures images and functions as imaging means. The imaging apparatus 110 associates the image data of a captured image, information about the imaging time and date of the captured image, and identification information, which is the information identifying the imaging apparatus 110, with one another and transmits the associated information to an external apparatus such as the information processing apparatus 100 or the storage apparatus 120 via the network 140. While the system according to the present exemplary embodiment includes only one imaging apparatus 110, the system may include a plurality of imaging apparatuses 110. That is, a plurality of imaging apparatuses 110 may be connected to the information processing apparatus 100 and the storage apparatus 120 via the network 140. In this case, the information processing apparatus 100 and the storage apparatus 120 determines which one of the plurality of imaging apparatuses 110 has captured a transmitted image, by using the identification information associated with the transmitted image, for example.

The storage apparatus 120 holds the image data of an image captured by the imaging apparatus 110, the information about the imaging time and date of the captured image, and the identification information identifying the imaging apparatus 110 in association with one another. In accordance with a request from the information processing apparatus 100, the storage apparatus 120 transmits the stored data (the image, the identification information, etc.) to the information processing apparatus 100.

The display 130 is a liquid crystal display (LCD) or the like and displays graphs generated by the information processing apparatus 100 and images captured by the imaging apparatus 110, for example. The display 130 is connected to the information processing apparatus 100 via a display cable that complies with communication standards such as high definition multimedia interface (HDMI(®)). At least two or all of the display 130, the information processing apparatus 100, and the storage apparatus 120 may be incorporated in a single enclosure.

While the graphs generated by the information processing apparatus 100 and the images captured by the imaging apparatus 110 are displayed on the display 130 connected to the information processing apparatus 100 via the above display cable, the graphs and images may be displayed on a display of any one of the following external apparatuses. That is, the graphs and the images may be displayed on a display of a mobile device such as a smartphone or a tablet terminal connected via the network 140.

Next, information processing of the information processing apparatus 100 according to the present exemplary embodiment will be described with reference to the functional block diagram of the information processing apparatus 100 according to the present exemplary embodiment illustrated in FIG. 2.

Figure 2:
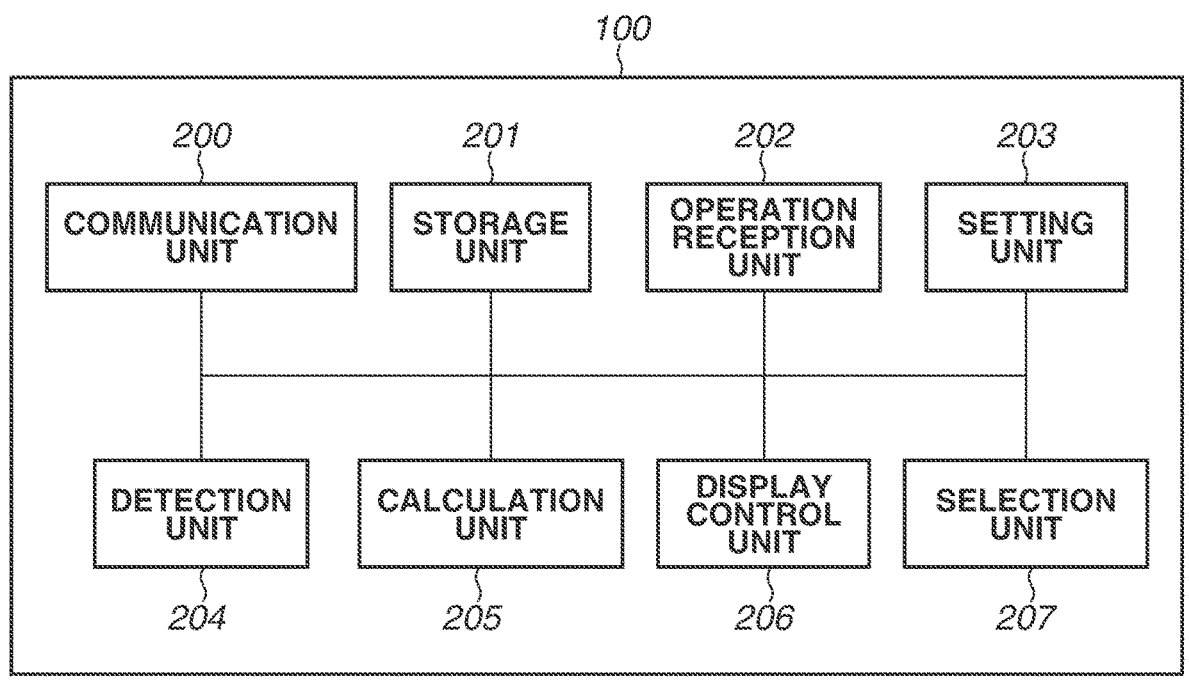
FIG. 2 is a functional block diagram of an information processing apparatus according to one embodiment.
Figure 8:
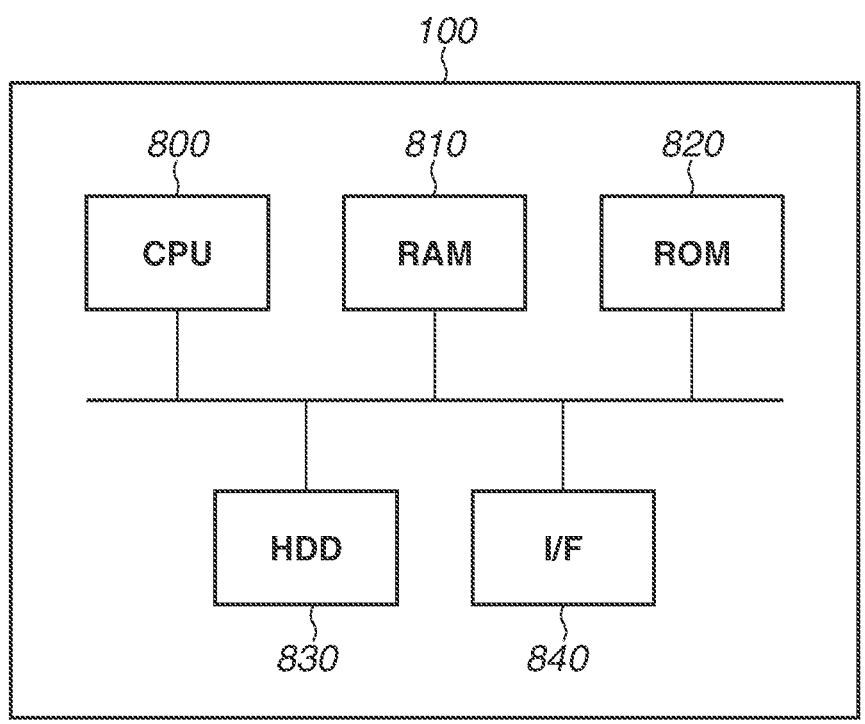
FIG. 8 illustrates a hardware configuration of an individual apparatus according to one embodiment.

The present exemplary embodiment will be described assuming that the individual functions illustrated in FIG. 2 are realized as follows by using a read-only memory (ROM) 820 and a central processing unit (CPU) 800, which will be described below with reference to FIG. 8. That is, the functions illustrated in FIG. 2 are realized by causing the CPU 800 of the information processing apparatus 100 to execute a computer program stored in the ROM 820 of the information processing apparatus 100.

The communication unit 200 may be realized by an interface (I/F) 840, which will be described below with reference to FIG. 8, and communicates with the imaging apparatus 110 and the storage apparatus 120 via the network 140. For example, the communication unit 200 receives image data of an image captured by the imaging apparatus 110 and transmits a control command for controlling the imaging apparatus 110 to the imaging apparatus 110. Examples of the control command include a command for instructing the imaging apparatus 110 to capture an image.

For example, the storage unit 201 may be realized by a random access memory (RAM) 810 or a hard disk drive (HDD) 830, which will be described below with reference to FIG. 8, and holds information or data about the information processing of the information processing apparatus 100. For example, the storage unit 201 holds information about the location of a certain object detected in an image.

The operation reception unit 202 receives user operations via an input device (not illustrated) such as a keyboard or a mouse. For example, the operation reception unit 202 receives an operation of specifying a predetermined area, which is within an area in an image and in which a certain object is detected.

The setting unit 203 sets this predetermined area in an image, based on a user operation. In this case, the operation reception unit 202 receives a user operation of specifying this predetermined area in an image displayed on the display 130, and the setting unit 203 sets the predetermined area in the image based on information indicating the location of the predetermined area received by the operation reception unit 202. The following description assumes that the location of the predetermined area is defined by the X and Y coordinates of each individual corner of the predetermined area when the top left corner of the image is used as the origin. The operation reception unit 202 receives information about the X and Y coordinates of each individual corner of the predetermined area specified by the user, and the setting unit 203 sets the predetermined area in the image, based on the X and Y coordinates of each individual corner received by the operation reception unit 202. If no predetermined area is specified by the user, the setting unit 203 may set the entire area of the image as the predetermined area.

The detection unit 204 performs detection processing for detecting a certain object included in a predetermined area in an image. The detection unit 204 according to the present exemplary embodiment detects a certain object in a predetermined area by performing processing such as pattern matching with a matching pattern (a dictionary). When detecting a person as a certain object in an image, the detection unit 204 may use a plurality of matching patterns, such as a matching pattern in which a person faces the front and a matching pattern in which a person faces sideways. The detection accuracy is expected to improve by performing detection processing with a plurality of matching patterns as described above.

A matching pattern in which a certain object is seen from another angle such as from a diagonal direction or an upward direction may also be prepared. When a person is detected as a certain object, a matching pattern (a dictionary) indicating features of the whole body does not necessarily need to be prepared. A matching pattern only for a part of a person such as the upper body, the lower body, the head, the face, or a leg may be prepared.

While a person is detected as a certain object in the present exemplary embodiment, the certain object does not need to be a person. For example, another object such as a car may be used as the certain object in other embodiments. In addition, while the detection unit 204 according to the present exemplary embodiment performs pattern matching as a method for detecting a certain object in an image, another conventional technique may be used to detect a certain object in an image.

The calculation unit 205 acquires a count result indicating the number of certain objects included in a predetermined area in an image captured by the imaging apparatus 110. The calculation unit 205 according to the present exemplary embodiment counts the certain objects detected in an image by the detection unit 204 and acquires, as the count result of the image, the counted number of certain objects. The count result calculated by the calculation unit 205, the image from which the count result is acquired, the imaging time and date at which the image is captured, and the identification information identifying the imaging apparatus that has captured the image are associated with one another, and the associated information is stored in the storage unit 201.

Alternatively, the calculation unit 205 may acquire a count result indicating the number of certain objects included in a predetermined area in an image captured by the imaging apparatus 110 in accordance with another method. For example, the imaging apparatus 110 detects certain objects included in a predetermined area in a captured image and acquires a count result by counting the certain objects detected in the image. Next, the imaging apparatus 110 associates the captured image, the imaging time and date of the captured image, the count result of the image, and the identification information with one another and transmits the associated information to the information processing apparatus 100. In this case, the calculation unit 205 in the information processing apparatus 100 acquires the count result transmitted from the imaging apparatus 110. As described above, the calculation unit 205 may acquire a count result indicating the number of certain objects in a predetermined area in an image from an external apparatus (for example, the imaging apparatus 110). The count result transmitted from the external apparatus (for example, the imaging apparatus 110), the image from which the count result has been acquired, the imaging time and date of the image, and the identification information identifying the imaging apparatus that has captured the image are associated with one another and stored in the storage unit 201.

In addition, the calculation unit 205 calculates a statistical value based on the count results of the certain objects acquired from the captured images. Specifically, the calculation unit 205 calculates a statistical value of a plurality of count results acquired from a plurality of images captured in each of a plurality of different time periods. The following description assumes a case in which a first time period and a second time period, which is different from the first time period, are set as the plurality of different time periods. In this case, the calculation unit 205 calculates a statistical value of a plurality of count results acquired from a plurality of images captured by the imaging apparatus 110 in the first time period. In addition, the calculation unit 205 calculates a statistical value of a plurality of count results acquired from a plurality of images captured by the imaging apparatus 110 in the second time period. In this way, the calculation unit 205 calculates a statistical value based on count results in each of a plurality of different time periods. According to the present exemplary embodiment, the statistical value is, for example, an average value, a median value, a mode, a minimum value, or a maximum value of a plurality of count results.

The display control unit 206 generates a graph that is based on a statistical value calculated by the calculation unit 205 in each individual time period and based on the count results acquired from images. Next, the display control unit 206 displays the graph on the display 130. In this operation, the display control unit 206 generates a graph including elements, each of which corresponds to a statistical value calculated by the calculation unit 205 in a corresponding time period. Next, the display control unit 206 displays the graph on the display 130.

The selection unit 207 performs the following processing when the user specifies an element in the graph displayed on the display 130. That is, from the plurality of images captured by the imaging apparatus 110 in the time period corresponding to the specified element, the selection unit 207 selects an image whose count result corresponds to the statistical value indicated by the element. The display control unit 206 displays the image selected by the selection unit 207 on the display 130.

Figure 3:
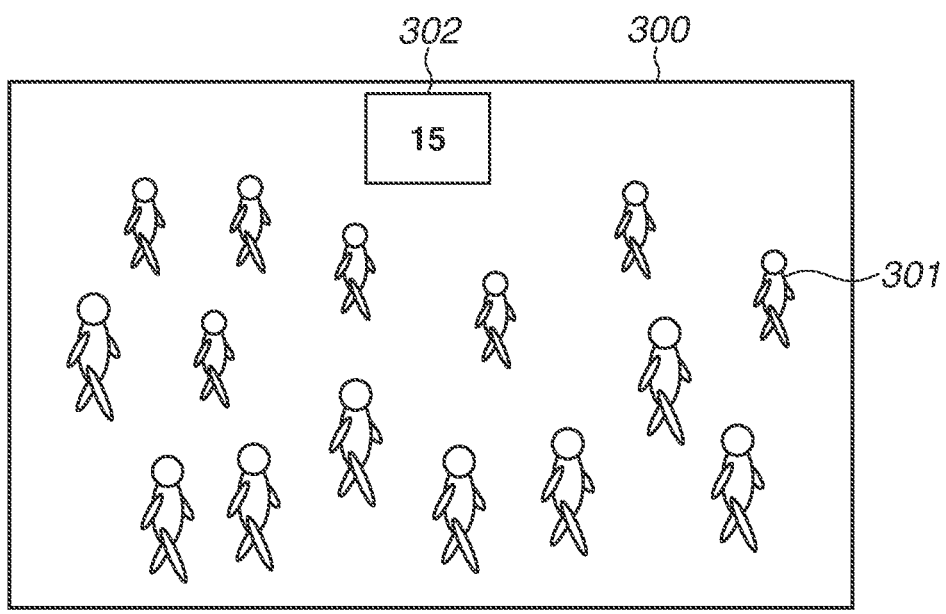
FIG. 3 illustrates an example of a displayed image according to one embodiment.

Next, the information processing of the information processing apparatus 100 according to the present exemplary embodiment will be described in more detail with reference to FIG. 3 to FIGS. 5A and 5B. FIG. 3 illustrates an example of an image displayed by the display control unit 206 on the display 130. As illustrated in FIG. 3, the display control unit 206 according to the present exemplary embodiment superimposes a numerical value 302 indicating a count result acquired by the calculation unit 205 from the captured image 300 on the image 300 and displays this image 300 on the display 130. The example illustrated in FIG. 3 assumes that the entire area of the image 300 is the predetermined area.

As a result, 15 people 301 have been detected in the captured image 300, and "15" has been acquired as the count result. Thus, the display control unit 206 superimposes the numerical value 302, which is "15", on the image 300, as the count result acquired by the calculation unit 205 from the captured image 300.

Figure 4:
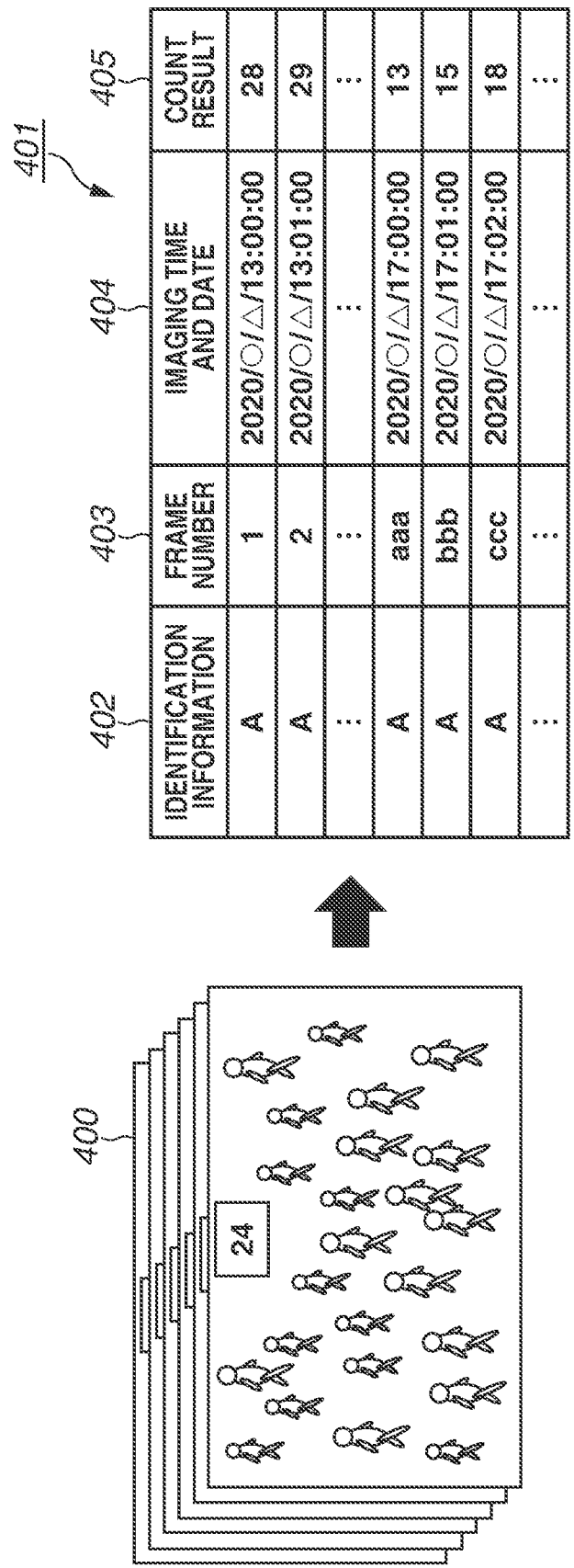
FIG. 4 illustrates a count history according to one embodiment.

Next, FIG. 4 illustrates a count history accumulated and held by the storage unit 201. As illustrated in FIG. 4, the storage unit 201 according to the present exemplary embodiment holds the following information about a group of images 400, which are a plurality of images captured by the imaging apparatus 110. That is, the storage unit 201 holds a count history 401 in which identification information 402 of the imaging apparatus 110, a frame number 403 identifying an image, imaging time and date 404 of an image, and a count result 405 acquired from an image are associated with one another per image. The count history 401 may be stored as a table having a format as illustrated in FIG. 4 or may be stored as a text file.

Figure 5A:
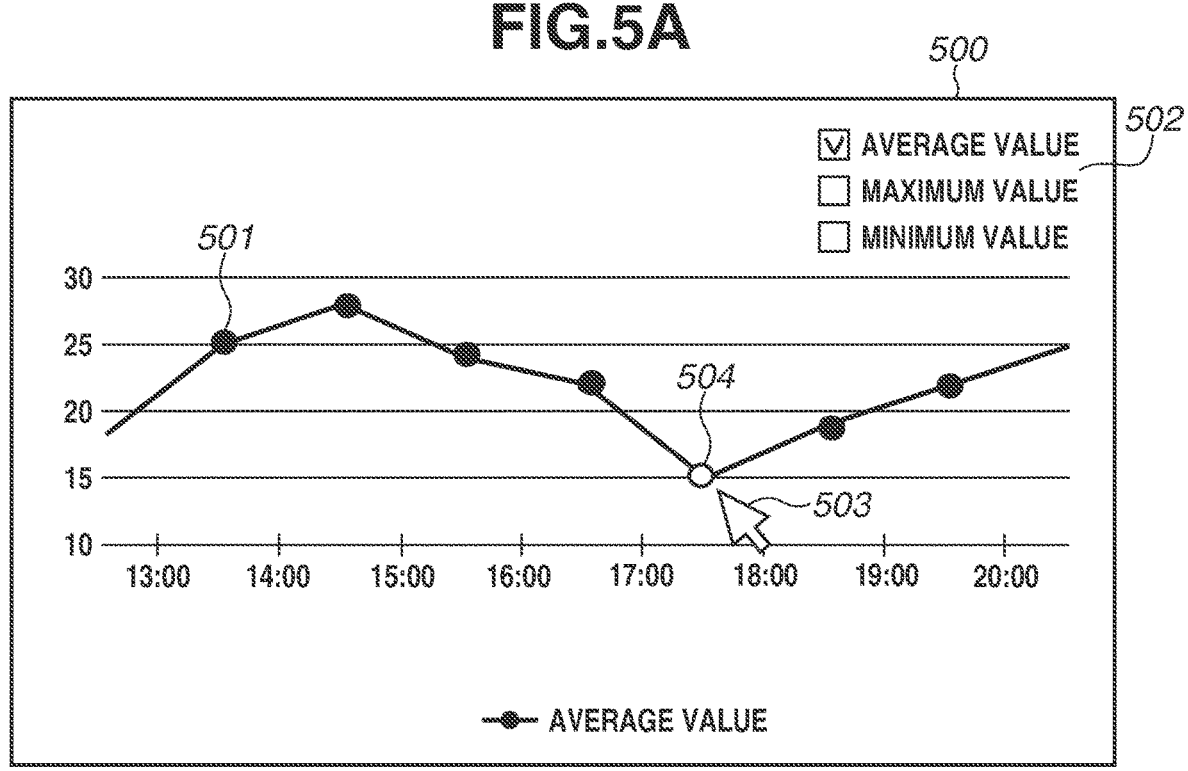
FIGS. 5A and 5B illustrate examples of displayed graphs according to one embodiment.
Figure 5B:
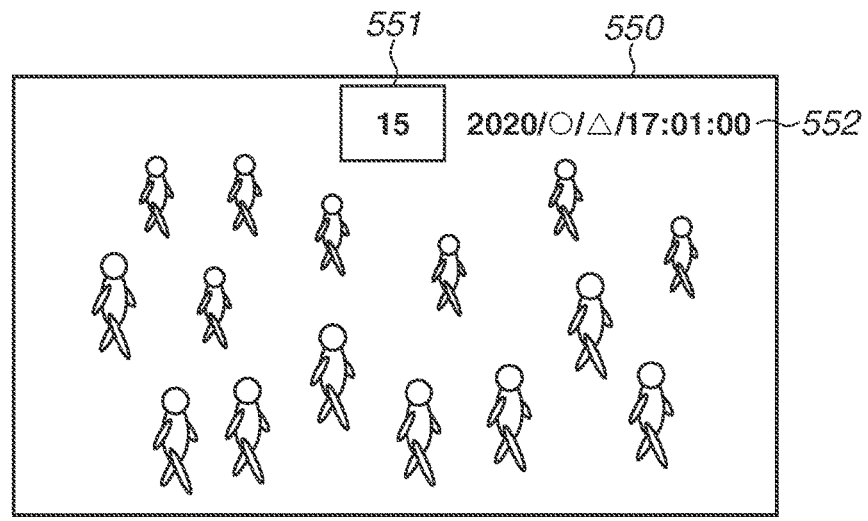

Next, a graph displayed by the display control unit 206 on the display 130 will be described with reference to FIGS. 5A and 5B. A graph 500 illustrated in FIG. 5A is displayed by the display control unit 206 according to the present exemplary embodiment on the display 130. The horizontal axis represents time periods in which count results are acquired, and the vertical axis represents the statistical value calculated by the calculation unit 205. As illustrated in FIG. 5A, an element indicating a statistical value calculated by the calculation unit 205 in each individual time period is displayed on the graph 500.

According to the present exemplary embodiment, the operation reception unit 202 receives a user operation specifying the time and date at which the count results are acquired, the time interval at which the count results are acquired, the kind of the statistical value to be calculated, and the identification information identifying the imaging apparatus 110 that has captured the images from which the count results are acquired. The kind of the statistical value signifies how the statistical value is acquired. For example, an average value, a median value, a mode, a minimum value, or a maximum value is used as the statistical value. Based on the time and date at which the count results are acquired, the time interval at which count results are acquired, the kind of the statistical value, and the identification information of the imaging apparatus 110, which have been received by the operation reception unit 202, the calculation unit 205 calculates a statistical value of the count results in each individual time period. For example, the following description assumes that "13:00 to 20:00 on Month/Day, 2020" is specified as the time and date at which the count results are acquired, "1 hour" as the time interval at which the count results are acquired, "average value" as the kind of the statistical value, and "imaging apparatus A" as the identification information of the imaging apparatus 110. In this case, the calculation unit 205 calculates an average value of the plurality of count results acquired from the plurality of images captured by the imaging apparatus A, which is the imaging apparatus 110, every time period, i.e., every one hour, from 13:00 to 20:00 on Month/Day, 2020. For example, the calculation unit 205 acquires the plurality of count results acquired from the plurality of images captured by the imaging apparatus A from 13:00 to 14:00 on Month/Day, 2020 from the storage unit 201 and calculates an average value of the plurality of count results. In this operation, for example, the calculation unit 205 calculates "25", which is the average value of the plurality of count results acquired from the plurality of images captured by the imaging apparatus A in the time period from 13:00 to 14:00, as the statistical value in this time period. In this case, the display control unit 206 plots an element 501 as the element corresponding to the value "25" calculated by the calculation unit 205 as the statistical value in the time period from 13:00 to 14:00 on the graph 500. As described above, an element corresponding to the statistical value based on the plurality of count results acquired from the plurality of images captured by the imaging apparatus 110 in the first time period set by the user is displayed on the graph 500. In addition, as in the case where the statistical value is calculated in the time period from 13:00 to 14:00, the calculation unit 205 calculates a statistical value (an average value in the example in FIGS. 5A and 5B) for each of the time periods every 1 hour from 14:00 to 20:00 of Month/Day, 2020. Next, the display control unit 206 arranges and plots the elements corresponding to the statistical values in the time periods calculated by the calculation unit 205 on the graph 500.

The graph 500 illustrated in FIG. 5A is a line graph. That is, the elements indicating the statistical values calculated in the respective time periods are represented as dots, and neighboring dots are connected to each other by a line. However, the present exemplary embodiment is not limited to this example. For example, a bar graph may be used as the graph 500, and the elements indicating the statistical values calculated in the respective time periods may be represented as bars. That is, the graph 500 may have any format as long as the relationship between a plurality of time periods and the statistical values calculated in the plurality of time periods is expressed. In the example illustrated in FIG. 5A, the time interval at which the count results are acquired is set to 1 hour. However, the present exemplary embodiment is not limited to this example. The user may set any time interval. In addition, while the user has specified an "imaging apparatus A" as the identification information of the imaging apparatus 110 in the example illustrated in FIGS. 5A and 5B, the present exemplary embodiment is not limited to this example. For example, if the user specifies "imaging apparatus A" and "imaging apparatus B" as the identification information of the imaging apparatus 110, the display control unit 206 may generate and display a graph 500 for each of the two imaging apparatuses 110 (the imaging apparatus A and the imaging apparatus B). In addition, while an average value is used as the statistical value calculated per time period, i.e., every 1 hour, from 13:00 to 20:00 by the calculation unit 205 in the example illustrated in FIG. 5A, the present exemplary embodiment is not limited to this example. For example, a different kind of statistical value (a maximum value or a minimum value, for example) may alternatively be used. The user can set the kind of the statistical value to be calculated, by specifying any one of the kinds of statistical values indicated in a selection item 502. Since an average value is used as the kind of the statistical value in the example in FIG. 5A, an item "average value" in the selection item 502 is checked, and the kind of the calculated statistical value is specified in the current graph 500. In this state, for example, if the operation reception unit 202 receives a user operation of selecting "maximum value" (if the user clicks "maximum value" with a mouse, for example) as a different kind of statistical value in the selection item 502, the following processing is performed. That is, the calculation unit 205 calculates the maximum value of the count results per time period, i.e., every 1 hour, from 13:00 to 20:00 on Month/Day, 2020. Next, the display control unit 206 arranges and plots the elements corresponding to the maximum values of their respective time periods calculated by the calculation unit 205 on the graph 500. As described above, the kind of the statistical value displayed on the graph 500 may adaptively be changed in accordance with a user operation. While the selection item 502 is superimposed on the graph 500 in the example illustrated in FIGS. 5A and 5B, the window of the selection item 502 and the window of the graph 500 may be displayed separately.

Next, the processing of the display control unit 206 and the selection unit 207 performed when the user specifies an element on the graph 500 will be described in more detail with reference to FIGS. 5A and 5B. As illustrated in FIG. 5A, the user operates a mouse 503 on the graph 500 displayed by the display control unit 206 on the display 130. If the operation reception unit 202 receives a user operation of specifying an element 504 among the plurality of elements included in the graph 500, the selection unit 207 performs the following processing. That is, from the plurality of images captured by the imaging apparatus A in the time period from 17:00 to 18:00 on Month/Day, 2020, which is the time period corresponding to the element 504, the selection unit 207 refers to the statistical value indicated by the element 504 and selects an image whose count result corresponds to the statistical value. Specifically, from the images indicated by the frame numbers 403 in the count history 401, the selection unit 207 specifies a plurality of images captured by the imaging apparatus A in the time period from 17:00 to 18:00 on Month/Day, 2020. Next, the selection unit 207 selects at least one image satisfying a predetermined condition from the specified plurality of images, based on a numerical value "15", which is the average value indicated by the specified element 504. This example assumes that the predetermined condition is a count result that is the closest to "15", which is the average value indicated by the specified element 504. In this case, for example, the selection unit 207 selects the image whose frame number 403 is "bbb", which is the image whose count result is the closest to the average value "15" indicated by the specified element 504. Next, the display control unit 206 acquires, from the storage unit 201, the image whose frame number 403 is "bbb" selected by the selection unit 207 and displays this image on the display 130. At this point, regarding the image displayed by the display control unit 206 on the display 130, a numerical value 551 indicating the count result and imaging time and date 552 of an image 550 are superimposed on the image 550 selected by the selection unit 207, as illustrated in FIG. 5B. The display control unit 206 may display the image 550 selected by the selection unit 207 and the graph 500 simultaneously. In this case, the display control unit 206 may display the image 550 selected by the selection unit 207 such that the image 550 overlaps the graph 500. The display control unit 206 may display the graph 500 and the image 550 selected by the selection unit 207 in different windows on the display 130. As described above, from the plurality of images captured in the time period corresponding to an element specified by the user, the selection unit 207 selects an image satisfying a predetermined condition based on the statistical value indicated by the element. In addition, the display control unit 206 displays the selected image on the display 130. As illustrated in FIG. 5A, if the operation reception unit 202 receives a user operation specifying the element 504 among the plurality of elements included in the graph 500, the display control unit 206 may display the specified element 504 differently from the other elements.

In the description of the present exemplary embodiment, from the plurality of images captured in the time period corresponding to an element selected by the user, the selection unit 207 selects an image whose count result is the closest to the statistical value indicated by the element, as the predetermined condition. However, the present exemplary embodiment is not limited to this example. For example, the selection unit 207 may be configured to select at least one image whose count result falls within a predetermined numerical value range of the statistical value indicated by the element selected by the user. In this case, the display control unit 206 displays at least one image selected by the selection unit 207 on the display 130.

From the plurality of images captured in the time period corresponding to an element selected by the user, if the selection unit 207 selects a plurality of images as the images satisfying the predetermined condition, the display control unit 206 may display all the plurality of images simultaneously on the display 130. The display control unit 206 may sequentially display the plurality of images on the display 130 in a slideshow format in the order of imaging time.

Figure 6:
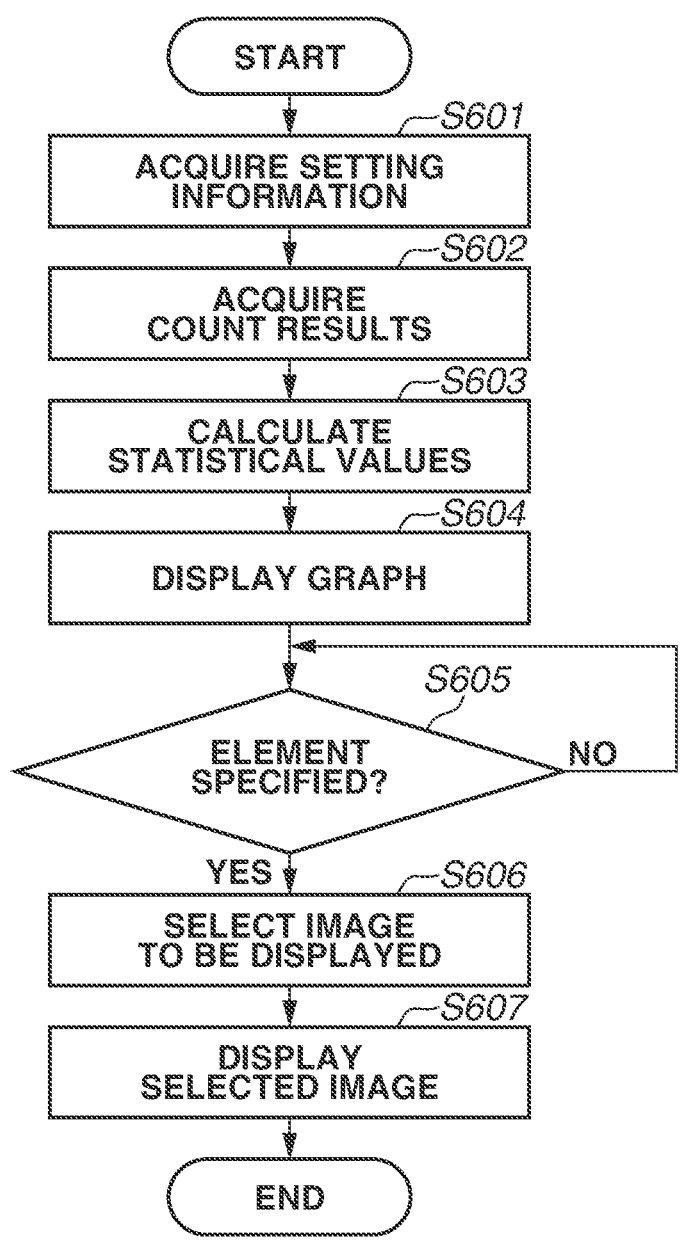
FIG. 6 is a flowchart illustrating information processing for displaying an image corresponding to a specified element according to one embodiment.

Next, the information processing according to the present exemplary embodiment will be described in more detail with reference to a flowchart in FIG. 6. By performing the flowchart illustrated in FIG. 6, a graph obtained by acquiring the count results can be displayed. In addition, in response to a user operation of specifying an element on the graph, an image whose count result corresponds to the statistical value indicated by the element can be displayed. The processing of the flowchart illustrated in FIG. 6 starts or ends in accordance with a user instruction, for example. The processing of the flowchart illustrated in FIG. 6 is executed by the functional blocks illustrated in FIG. 2 realized by causing the CPU 800 of the information processing apparatus 100 to execute a computer program stored in the ROM 820 of the information processing apparatus 100.

First, in step S601, the calculation unit 205 acquires setting information including the time and date at which the count results are acquired, the time interval at which the count results are acquired, the kind of the statistical value to be calculated, and the identification information of the imaging apparatus 110 that has captured the images whose count results are acquired. In the present exemplary embodiment, the operation reception unit 202 receives a user operation of specifying the time and date at which the count results are acquired, the time interval at which the count results are acquired, the kind of the statistical value to be calculated, and the identification information of the imaging apparatus 110 that has captured the images whose count results are acquired. In this way, the calculation unit 205 acquires the setting information specified by the user. The following example assumes that the calculation unit 205 has acquired the following setting information. That is, the following description assumes a case in which "13:00 to 20:00 on Month/Day, 2020" is specified as the time and date at which the count results are acquired, "1 hour" as the time interval at which the count results are acquired, "average value" as the kind of the statistical value, and "imaging apparatus A" as the identification information of the imaging apparatus 110.

Next, in step S602, based on the setting information acquired in step S601, the calculation unit 205 acquires the count results at the above time and date. For example, from the count history 401 stored in the storage unit 201, the calculation unit 205 acquires information about a plurality of count results acquired from a plurality of images captured by the imaging apparatus A from 13:00 to 20:00 on Month/Day, 2020.

Next, in step S603, based on the plurality of count results acquired in step S602, the time interval at which the count results are acquired, and the kind of the statistical value, the calculation unit 205 calculates a statistical value of the count results in each individual time period. For example, the calculation unit 205 calculates an average value of the plurality of count results acquired from the plurality of images captured by the imaging apparatus A, which is the imaging apparatus 110, per time period, i.e., every 1 hour, from 13:00 to 20:00 Month/Day, 2020.

Next, in step S604, the display control unit 206 generates a graph including the elements corresponding to the statistical values in the time periods calculated by the calculation unit 205 and displays the graph on the display 130. As described with reference to FIGS. 5A and 5B, for example, the display control unit 206 displays the graph 500 illustrated in FIG. 5A on the display 130.

Next, if the operation reception unit 202 receives an operation of specifying an element on the graph displayed by the display control unit 206 on the display 130 (YES in step S605), the processing proceeds to step S606. If the operation reception unit 202 does not receive an operation of specifying an element on the graph displayed by the display control unit 206 on the display 130 (NO in step S605), step S605 is repeated until the operation reception unit 202 receives a user operation of specifying an element.

Next, in step S606, from the plurality of images captured in the time period corresponding to the specified element, based on the statistical value indicated by the specified element, the selection unit 207 selects an image whose count result corresponds to the statistical value as the image to be displayed. The following example assumes that the user specifies the element 504 in FIG. 5A. In this case, the selection unit 207 specifies the plurality of images captured by the imaging apparatus A in the time period from 17:00 to 18:00 Month/Day, 2020 among the images indicated by the frame numbers 403 in the count history 401. Based on the numerical value "15", which is the statistical value indicated by the specified element 504 (an average value in FIG. 5A), the selection unit 207 selects an image whose count result is the closest to "15" from the specified plurality of images. In this case, the selection unit 207 selects the image whose frame number 403 is "bbb", which is the image whose count result is the closest to "15", from the images having the frame numbers 403 in the count history 401.

The following description assumes a case where, among the group of images captured in the time period corresponding to the specified element 504, there are a plurality of images whose count results correspond to "15", which is the statistical value indicated by the element 504. Specifically, the following description assumes a case where, among the group of images captured in the time period corresponding to the specified element 504, there are a plurality of images (for example, a plurality of images each having "15" as their count result) whose count results are the closest to "15", which is the statistical value indicated by the element 504. In this case, the selection unit 207 may perform the following processing. That is, from the group of images captured in the time period corresponding to the specified element 504, the selection unit 207 may select all the plurality of images whose count results are the closest to "15", as the images to be displayed. In addition, from the plurality of images whose count results are the closest to "15", based on the luminance values of the images, the selection unit 207 may select at least one image to be displayed. Specifically, from the plurality of images whose count results are the closest to "15", the selection unit 207 may select an image whose average pixel luminance value is the highest as the image to be displayed. In addition, from the plurality of images whose count results are the closest to "15", the selection unit 207 may select an image having the oldest imaging time and date or the latest imaging time and date as the image to be displayed.

Next, in step S607, the display control unit 206 displays the image selected by the selection unit 207 in step S606 on the display 130. If the selection unit 207 selects the image corresponding to "bbb" as the frame number 403 in step S606, the display control unit 206 performs the following processing, for example. That is, the display control unit 206 acquires the image from the storage unit 201, superimposes the numerical value indicating the count result of the image and the imaging time and date of the image on the image, and displays the resultant image on the display 130. For example, the display control unit 206 displays the image 550 illustrated in FIG. 5B.

As described above, the information processing apparatus 100 according to the present exemplary embodiment displays a graph including a first element that is based on a plurality of count results acquired from a plurality of images captured by the imaging apparatus 110 in a first time period on a display. If a user operation of specifying the first element on the displayed graph is received, based on a statistical value indicated by the first element, the selection unit 207 selects, from the plurality of images captured in the first time period corresponding to the first element, an image whose count result corresponds to the statistical value. Next, the display control unit 206 displays the image selected by the selection unit 207 on the display 130. In this way, by displaying an image whose count result corresponds to the statistical value indicated by the element specified by the user, it is possible to reduce the deviation between the statistical value indicated by the specified element and the count result of the displayed image and to reduce any potential confusion by the user.

In the first exemplary embodiment, a method for presenting an image having a value close to a statistical value indicated by an element plotted on a graph has been described. Next, a different image presentation method used by an information processing apparatus 100 according to a second exemplary embodiment will be described. What is different from that of the first exemplary embodiment will mainly be described. The components and processing the same as or similar to those according to the first exemplary embodiment will be denoted by the same reference characters, and redundant description will be avoided.

Figure 7:
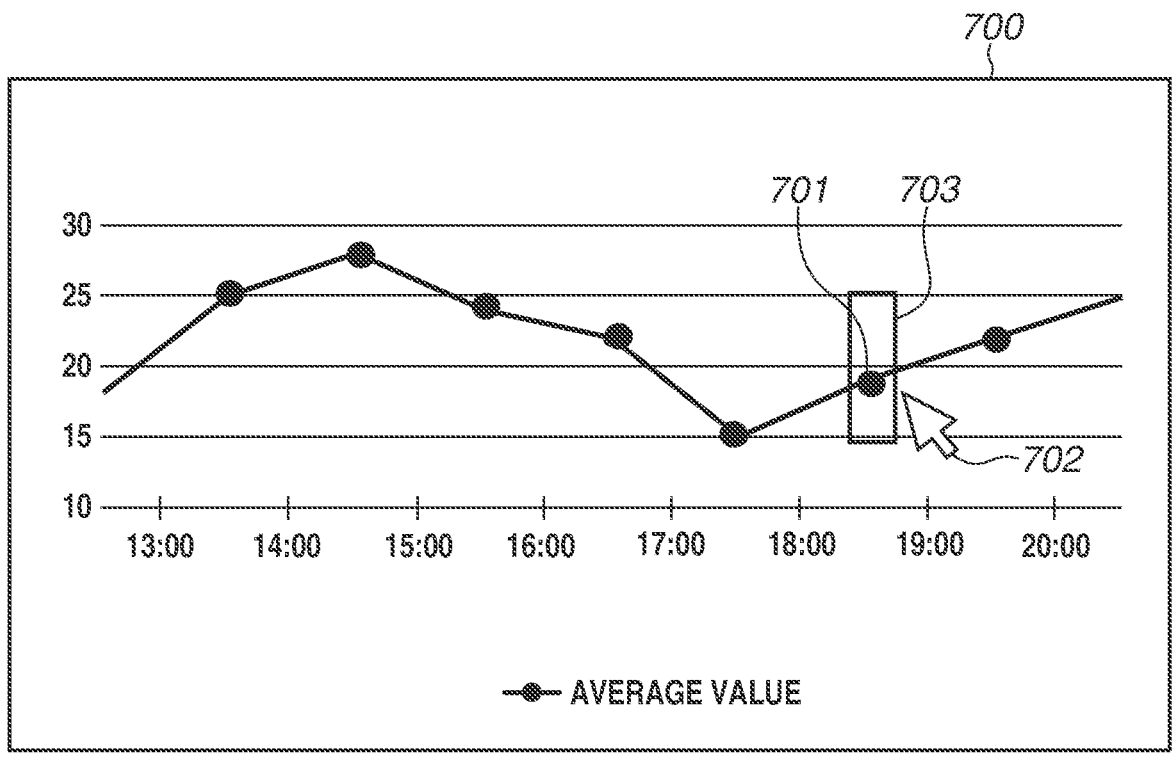
FIG. 7 illustrates an example of a displayed graph according to one embodiment.

As in the graph 500 illustrated in FIG. 5A, a graph 700 illustrated in FIG. 7 is displayed on the display 130 by the display control unit 206 according to the present exemplary embodiment. The horizontal axis represents the time periods in which the count results are acquired, and the vertical axis represents the calculated statistical value. As illustrated in FIG. 5A, an element indicating a statistical value calculated by the calculation unit 205 in each individual time period calculated by the calculation unit 205 is displayed in the graph 700. In the graph 700 illustrated in FIG. 7, a statistical value indicated by an element displayed in a time period is an average value of the count results calculated in the time period.

In the example illustrated in FIG. 7, the user moves a mouse 702 to a location close to an element 701 in the graph 700 displayed on the display 130. In this case, when the mouse 702 is located within a predetermined range including the location of the element 701 as the center, the display control unit 206 displays an extended element 703 of the element 701. As illustrated in FIG. 7, the extended element 703 is rectangular, the right side and the left side thereof are parallel to the vertical axis of the graph, and the upper side and the lower side thereof are parallel to the horizontal axis of the graph. In addition, in the example illustrated in FIG. 7, the extended element 703 indicates a range from the minimum value to the maximum value of the plurality of count results acquired from the plurality of images captured in the time period from 18:00 to 19:00 on Month/Day, 2020. Specifically, the location of the upper side of the rectangular extended element 703 indicates the maximum value of the plurality of count results acquired from the plurality of images captured in the time period from 18:00 to 19:00 on Month/Day, 2020. Likewise, the location of the lower side of the rectangular extended element 703 indicates the minimum value of the plurality of count results acquired from the plurality of images captured in the time period from 18:00 to 19:00 on Month/Day, 2020. In the example illustrated in FIG. 7, among the plurality of count results acquired from the plurality of images captured in the time period from 18:00 to 19:00 on Month/Day, 2020, the minimum value is "15", and the maximum value is "25".

In addition, while the extended element 703 of the element 701 is displayed in the graph 700, the user can also specify any location on the element 703. In response to this, the selection unit 207 specifies the statistical value on the vertical axis of the graph 700 indicated by the location specified by the user, and selects, based on the specified statistical value, the image whose count result corresponds to the statistical value from the plurality of images captured in the time period corresponding to the extended element 703. If the operation reception unit 202 receives an operation of specifying the location of the upper side of the rectangular extended element 703, the selection unit 207 specifies "25" as the statistical value on the vertical axis of the graph 700 indicated by the location of the upper side. Next, the selection unit 207 refers to the count history 401 and selects the image whose count result is the closest to the statistical value "25" in the time period from 18:00 to 19:00 on Month/Day, 2020, which is the time period corresponding to the extended element 703. Next, the display control unit 206 displays the image selected by the selection unit 207 on the display 130. As described above, the information processing apparatus 100 according to the present exemplary embodiment displays a graph including a first element that is based on a plurality of count results acquired from a plurality of images captured by the imaging apparatus 110 in a first time period on the display 130. In addition, based on a user operation, the display control unit 206 displays a first extended element of the first element corresponding to the first time period on the display 130. Next, in accordance with a user operation specifying a predetermined location on the first extended element, based on a statistical value indicated by the predetermined location on the graph, the selection unit 207 selects an image whose count result corresponds to the statistical value. Next, the display control unit 206 displays the image selected by the selection unit 207 on the display 130.

While the area of the extended element 703 is displayed in one color in the example illustrated in FIG. 7, the present exemplary embodiment is not limited to this example. For example, the display control unit 206 may refer to the count history 401 and display the area of the values of the count results acquired in the time period (18:00 to 19:00) corresponding to the extended element 703 and the area of the values of the count results acquired in other than the time period in such a manner that these areas can be distinguished from each other. Alternatively, the display control unit 206 may refer to the count history 401 and perform display in the time period (18:00 to 19:00) corresponding to the extended element 703 in different tones, such as through gradation, depending on the frequency of the detected count result. That is, in the time period (18:00 to 19:00) corresponding to the extended element 703, the area of the value of a more frequently detected count result and the area of the value of a less frequently detected count result may be displayed in different color tones. In this way, the user can intuitively select a desired image.

In addition, in the example illustrated in FIG. 7, when the mouse 702 operated by the user is located within a predetermined range including the location of the element 701 as the center, the display control unit 206 displays the extended element 703 of the element 701. However, the present exemplary embodiment is not limited to this example. That is, when the operation reception unit 202 receives a user operation of setting the extended element display function to on, the display control unit 206 may display the extended elements of all the elements included in the graph 700. In addition, regardless of the user operation, the display control unit 206 may display the extended elements of all the elements included in the graph 700.

The information processing apparatus 100 according to the present exemplary embodiment that has thus been described displays an image whose count result corresponds to a statistical value indicated by the location of an extended element on a graph. In this way, it is possible to reduce the deviation between the statistical value indicated by the location of the extended element and the value of the count result of the displayed image and to reduce potential confusion by the user.

Other Embodiments

Next, a hardware configuration of the information processing apparatus 100 for realizing the individual functions of the exemplary embodiments will be described with reference to FIG. 8. While a hardware configuration of the information processing apparatus 100 will hereinafter be described, the storage apparatus 120 and the imaging apparatus 110 may also be realized by a similar hardware configuration.

The information processing apparatus 100 according to the present exemplary embodiment includes a CPU 800, a RAM 810, a ROM 820, an HDD 830, and an I/F 840. The CPU 800 comprehensively controls the information processing apparatus 100. The RAM 810 temporarily holds a computer program executed by the CPU 800. In addition, the RAM 810 provides a work area used by the CPU 800 to execute its processing. For example, the RAM 810 also functions as a frame memory or a buffer memory.

The ROM 820 holds a program, etc. used by the CPU 800 to control the information processing apparatus 100. The HDD 830 is a storage device holding image data, etc. The I/F 840 communicates with an external apparatus in accordance with, for example, Transmission Control Protocol/Internet Protocol(TCP/IP) or Hypertext Transfer Protocol(HTTP), via the network 140.

While the above exemplary embodiments have been described based on an example in which the CPU 800 performs processing, at least part of the processing of the CPU 800 may be performed by a dedicated hardware in other embodiments. For example, the processing for displaying a graphical user interface (GUI) or image data on the display 130 may be performed by a graphics processing unit (GPU). The processing for reading a program code from the ROM 820 and loading the program code on the RAM 810 may be performed by a direct memory access (DMA) that functions as a transfer device.

At least one processor may read and execute a program that realizes at least one of the functions according to the above exemplary embodiments of the present disclosure. The program may be supplied to a system or an apparatus that has a processor via a network or a storage medium. Various embodiments of the present disclosure may be realized by a circuit (for example, an application specific integrated circuit (ASIC)) that realizes at least one of the functions according to the above exemplary embodiments. The units of the information processing apparatus 100 may be realized by the hardware components illustrated in FIG. 8, for example, or software components.

In other embodiments of the present disclosure, an apparatus may have at least one of the functions of the information processing apparatus 100 according to the above exemplary embodiments. For example, the imaging apparatus 110 may have at least one of the functions of the information processing apparatus 100 according to the above exemplary embodiments. Various embodiments of the present disclosure may be implemented by combining features of the above exemplary embodiments, for example, by freely combining the above exemplary embodiments.

While various embodiments of the present disclosure have been described with the above exemplary embodiments, these exemplary embodiments are only examples for implementing the present invention. These exemplary embodiments should not be deemed to limit the technical scope of the present invention. That is, the present invention can be carried out in various forms without departing from the technical concept or its main features. For example, various combinations of the exemplary embodiments are included in the content of the disclosure of the present application.

According to various embodiments described above, it is possible to provide an improved UI relating to a graph based on count results of objects in images, and this UI can reduce potential confusion by users as described above.

Other Embodiments

Various embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While exemplary embodiments have been described, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2020-113354, filed Jun. 30, 2020, which is hereby incorporated by reference herein in its entirety.

What is claimed is:

1. An information processing apparatus comprising a computer executing instructions that, when executed by the computer, cause the computer to:
acquire a first plurality of count results each indicating a number of objects included in a predetermined area in a different one of a first plurality of images captured by an imaging unit during a first time period;
acquire a second plurality of count results each indicating a number of objects included in the predetermined area in a different one of a second plurality of images captured by the imaging unit during a second time period, the second time period being different from the first time period;
cause a display unit to display a graph including at least a first element and a second element,
wherein the first element is associated with the first time period and a first numerical value that is determined based on the first plurality of count results acquired from the first plurality of images captured during the first time period;
wherein the second element is associated with the second time period and a second numerical value that is determined based on the second plurality of count results acquired from the second plurality of images captured during the second time period
receive a user operation specifying an element from among a plurality of elements included in the graph displayed on the display unit;
select, in a case where a user operation specifying the first element is received, at least one of the first plurality of images captured during the first time period, wherein each of the selected at least one of the first plurality of images has a respective count result that corresponds to the first numerical value; and
cause the display unit to display the at least one image selected by the selecting.

2. The information processing apparatus according to claim 1,
wherein, in a case where a user operation specifying the second element in the graph displayed on the display unit is performed, one of the plurality of images captured during the second time period is selected based on (a) the second numerical value and (b) at least one of the second plurality of count results acquired from the second plurality of images captured during the second time period.

3. The information processing apparatus according to claim 1, wherein the image selected from the first plurality of images is an image whose count result corresponds to the first numerical value indicated by the first element.

4. The information processing apparatus according to claim 3, wherein, in a case where (a) a user operation specifying the first element in the graph displayed on the display unit is received and (b) there are two or more images, from among the plurality of images captured during the first time period, whose count results correspond to the first numerical value indicated by the first element, at least one image from said two or more images whose count results correspond to the first numerical value indicated by the first element, is selected based on luminance of each of said two or more images, and
wherein the at least one selected image is displayed on the display unit.

5. The information processing apparatus according to claim 3, wherein, in a case where (a) a user operation specifying the first element in the graph displayed on the display unit is received and (b) there are two or more images, from among the first plurality of images captured during the first time period, whose count results correspond to the first numerical value indicated by the first element, all of said images whose count results correspond to the first numerical value indicated by the first element are displayed on the display unit.

6. The information processing apparatus according to claim 3, wherein the selected image has an associated count result that is the closest, from among the associated count results of the first plurality of images, to the first numerical value associated with the first element.

7. The information processing apparatus according to claim 1, wherein, in a case where (a) a user operation specifying the first element in the graph displayed on the display unit is received and (b) there are candidate images from among the first plurality of images captured during the first time period, whose count results correspond to the first numerical value associated with the first element, an image is selected from among said candidate images based on a captured time of each of said candidate images,
wherein the selected image is displayed on the display.

8. The information processing apparatus according to claim 1, wherein the first element indicates a number that corresponds to the first numerical value, which is a statistical value associated with the first plurality of count results acquired from the first plurality of images captured by the imaging unit during the first time period.

9. The information processing apparatus according to claim 8, wherein the statistical value associated with the first plurality of count results is an average value, a median value, a mode, a minimum value, or a maximum value of the plurality of count results.

10. The information processing apparatus according to claim 8, wherein a selection item used for selecting a kind of the statistical value is displayed on the display unit while the graph is displayed.

11. The information processing apparatus according to claim 1,
wherein the graph is a line graph having two axes, one of the two axes relating to a number of objects in a predetermined area and the other one of the two axes corresponding to a time period, and
wherein the first element is one of elements in the line graph.

12. The information processing apparatus according to claim 1,
wherein the graph is a bar graph having two axes, one of the two axes relating to a number of objects in a predetermined area and the other one of the two axes corresponding to a time period, and
wherein the first element is one of elements in the bar graph.

13. An information processing method comprising:
acquiring a first plurality of count results each indicating a number of objects included in a predetermined area in a different one of a first plurality of images captured by an imaging unit during a first time period;
acquiring a second plurality of count results each indicating a number of objects included in the predetermined area in a different one of a second plurality of images captured by the imaging unit during a second time period, the second time period being different from the first time period;
causing a display unit to display a graph including at least a first element and a second element,
wherein the first element is associated with the first time period and a first numerical value that is determined based on the first plurality of count results acquired from the first plurality of images captured during the first time period;
wherein the second element is associated with the second time period and a second numerical value that is determined based on the second plurality of count results acquired from the second plurality of images captured during the second time period
receiving a user operation specifying an element from among a plurality of elements included in the graph displayed on the display unit;
in a case where a user operation specifying the first element is received, selecting at least one of the first plurality of images captured during the first time period, wherein each of the selected at least one of the first plurality of images has a respective count result that corresponds to the first numerical value; and
causing the display unit to display the at least one image selected by the selecting.

14. The information processing method according to claim 13,
wherein, in a case where a user operation specifying the second element in the graph displayed on the display unit is performed, one of the plurality of images captured during the second time period is selected based on (a) the second numerical value and (b) at least one of the second plurality of count results acquired from the second plurality of images captured during the second time period.

15. The information processing method according to claim 13, wherein the image selected from the first plurality of images is an image whose count result corresponds to the first numerical value indicated by the first element.

16. The information processing method according to claim 15, wherein, in a case where (a) a user operation specifying the first element in the graph displayed on the display unit is received and (b) there are two or more images, from among the plurality of images captured during the first time period, whose count results correspond to the first numerical value indicated by the first element, at least one image from said two or more images whose count results correspond to the first numerical value indicated by the first element, is selected based on luminance of each of said two or more images, and
wherein the at least one selected image is displayed on the display unit.

17. The information processing method according to claim 15, wherein, in a case where (a) a user operation specifying the first element in the graph displayed on the display unit is received and (b) there are two or more images, from among the first plurality of images captured during the first time period, whose count results correspond to the first numerical value indicated by the first element, all of said images whose count results correspond to the first numerical value indicated by the first element are displayed on the display unit.

18. The information processing method according to claim 15, wherein the selected image has an associated count result that is the closest, from among the associated count results of the first plurality of images, to the first numerical value associated with the first element.

19. The information processing method according to claim 13, wherein, in a case where (a) a user operation specifying the first element in the graph displayed on the display unit is received and (b) there are candidate images from among the first plurality of images captured during the first time period, whose count results correspond to the first numerical value associated with the first element, an image is selected from among said candidate images based on a captured time of each of said candidate images.

20. The information processing method according to claim 13, wherein the first element indicates a number that corresponds to the first numerical value, which is a statistical value associated with the first plurality of count results acquired in the acquiring from the first plurality of images captured by the imaging unit during the first time period.

21. The information processing method according to claim 20, wherein the statistical value associated with the first plurality of count results is an average value, a median value, a mode, a minimum value, or a maximum value of the plurality of count results.

22. A non-transitory computer readable storage medium that stores instructions that when executed by a computer, cause the computer to perform a process comprising:
acquiring a first plurality of count results each indicating a number of objects included in a predetermined area in a different one of a first plurality of images captured by an imaging unit during a first time period;
acquiring a second plurality of count results each indicating a number of objects included in the predetermined area in a different one of a second plurality of images captured by the imaging unit during a second time period, the second time period being different from the first time period;
causing a display unit to display a graph including at least a first element and a second element,
wherein the first element is associated with the first time period and a first numerical value that is determined based on the first plurality of count results acquired from the first plurality of images captured during the first time period;
wherein the second element is associated with the second time period and a second numerical value that is determined based on the second plurality of count results acquired from the second plurality of images captured during the second time period
receiving a user operation specifying an element from among a plurality of elements included in the graph displayed on the display unit;
in a case where a user operation specifying the first element is received, selecting at least one of the first plurality of images captured during the first time period, wherein each of the selected at least one of the first plurality of images has a respective count result that corresponds to the first numerical value; and
causing the display unit to display the at least one image selected by the selecting.

* * * * *